UNITED STATES PATENT OFFICE 2,185,824

MEDICINAL AGENT

Gordon A. Alles, Los Angeles, Calif.

No Drawing. Original application September 16, 1938, Serial No. 230,205. Divided and this application October 21, 1939, Serial No. 300,662

4 Claims. (Cl. 167—65)

This invention relates to a medicinal agent having various uses in therapeutic treatment of animals and man.

The principal object of the invention is to provide a new and useful medicinal agent.

The new medicinal agent in accordance with this invention will be found to have various medical uses, and from the standpoint of its therapeutic characteristics, will be found effective for various purposes and particularly for administration to mucosal membranes to stimulate peripheral neuro-muscular mechanisms under the control of the sympathetic nervous system.

The medicinal agent in accordance with this invention may be employed in various forms and may be variously administered. Thus, for example, it may be used in liquid solution, or in solid form such as in powder or tablets, alone or with other ingredients as desired, and it may be variously administered, for example, by mouth or rectally for application to the mucosal membrane comprising the gastro-intestinal tract, or it may be locally administered to other mucosal membranes as, for example, the nasal mucosa and the conjunctiva of the eye by tampon, dropper or spray.

Broadly speaking, the new medicinal agent in accordance with this invention comprises the stable, soluble non-toxic addition salts of 1-(parahydroxyphenyl)-2-aminopropane, as, for example, the hydrochloride, hydrobromide, hydrosulfate, hydrogen acid tartrate, and the like.

The compound 1-(parahydroxyphenyl)-2-aminopropane was described in the German Patent No. 243,546, issued February 13, 1912, as having therapeutic properties closely similar to those of 1-(parahydroxyphenyl)-2-aminoethane. This latter drug compound has been well established to exert a stimulant action upon body functions that are activated by the sympathetic nervous system, but its effects as with many related compounds, are only evident when the drug is introduced parenterally.

In my studies, I have found that the administration of 20, 50, 100 or even 200 milligrams of 1-(parahydroxyphenyl)-2-aminoethane hydrochloride by mouth to man was not effective in causing a change in blood pressure, which would result from stimulation of the sympathetic nervous system of the blood vessels and heart. However, the oral administration of but 20 milligrams of 1-(parahydroxyphenyl)-2-aminopropane hydrochloride to man was usually effective in causing a definite rise in blood pressure accompanied often by an evident change in heart rate. The oral administration of as much as 50 milligrams of the same compound to man was regularly effective, in causing a marked rise in blood pressure that often exceeded the normal level by 50 or more millimeters of mercury pressure, and in causing a marked change in heart rate. The following tables are further illustrative of the comparative effect of these two compounds on blood pressure when applied to the mucosal membrane comprising the gastro-intestinal tract:

Table I

|  | Milligrams of 1-(parahydroxyphenyl)-2-aminoethane taken orally | | | |
| --- | --- | --- | --- | --- |
|  | 20 mg. | 50 mg. | 100 mg. | 200 mg. |
| Initial values before taking drug compound | 110/70-64  106/68-60 | 112/68-62  112/70-60 | 114/76-70  110/76-72 | 112/72-72  112/72-74 |
| After 10 minutes | 108/68-62 | 112/70-58 | 112/76-70 | 114/68-74 |
| After 20 minutes | 104/68-62 | 112/70-56 | 110/74-66 | 118/66-74 |
| After 30 minutes | 106/68-62 | 114/72-56 | 110/74-66 | 114/68-76 |
| After 40 minutes | 102/70-60 | 112/70-58 | 112/76-66 | 112/66-74 |
| After 50 minutes | 106/70-58 | 112/70-54 | 112/76-70 | 112/70-64 |
| After 60 minutes | 106/70-58 | 112/72-54 | 112/76-66 | 112/70-70 |
| After 80 minutes | 108/76-56 | 110/72-52 | 110/74-62 | 110/66-70 |
| After 100 minutes | 110/74-56 | 112/72-52 | 110/72-66 | 112/74-66 |
| After 120 minutes | 106/74-56 | 110/70-52 | 112/74-64 | 112/74-66 |

Table II

|  | Milligrams of 1-(parahydroxyphenyl)-2-aminopropane taken orally | |
| --- | --- | --- |
|  | 20 mg. | 50 mg. |
| Initial values before taking drug compound | 114/76—60  114/76—54 | 106/66—60  104/66—60 |
| After 10 minutes | 112/72—54 | 112/68—54 |
| After 20 minutes | 114/74—52 | 142/82—52 |
| After 30 minutes | 120/78—54 | 152/88—52 |
| After 40 minutes | 120/74—52 | 154/88—48 |
| After 50 minutes | 122/76—52 | 144/88—48 |
| After 60 minutes | 118/78—54 | 144/88—50 |
| After 80 minutes | 116/78—54 | 138/88—52 |
| After 100 minutes | 116/78—50 | 120/74—54 |
| After 120 minutes | 112/76—52 | 112/74—54 |
| After 140 minutes |  | 106/70—56 |
| After 160 minutes |  | 106/68—56 |
| After 180 minutes |  | 106/74—58 |

Other stable acid addition salts such as the hydrobromide, the hydrosulfate and the hydrogen acid tartrate are equivalently effective with the hydrochloride.

A study of the pharmacological activity of the stable, soluble non-toxic salts of 1-(parahydroxyphenyl)-2-aminopropane has shown that, when applied directly to mucosal membranes, they will be found to be stimulating to peripheral neuro-muscular mechanisms under the control of the sympathetic nervous system. This stimulation results in various physiological and therapeutically useful effects, other than its pressor action as detailed ante, such as, for example, dilatation of constricted bronchial muscles such as are responsible for asthmatic attacks, the production of mydriasis, making it of particular use in refraction, vasoconstriction of the nasal mucosa, etc. If desired, general systemic stimulation may be produced by bringing the medicinal agent contemplated by this invention into contact with the gastro-intestinal mucosa through oral or rectal administration. Localized action may be obtained by topical application to other mucosal surfaces such as the eye or nose.

The medicinal agents contemplated by this invention may be readily prepared according to well known procedure. Thus, for example, the base, 1-(parahydroxyphenyl)-2-aminopropane, is first prepared, for example, by hydrolysis and demethylation of 1-(paramethoxyphenyl)-2-formylaminopropane which, in turn, may be prepared, for example, by methods fully desribed in United States Patent No. 2,011,790, issued to me on August 20, 1935. The stable, soluble non-toxic acid addition salts are then readily prepared, for example, from a solution of the base in a suitable solvent by neutralization with an acid corresponding to the particular salt desired and crystallization of the salt from solution.

In using the broad and specific embodiments of this invention as a medicinal agent, the desired salt of 1-(parahydroxyphenyl)-2-aminopropane may be orally or rectally administered in solid tabletted form suitably extended by association with an excipient such as lactose, starch, etc. or in aqueous or alcoholic solutions. For local application to other mucosal surfaces such as the nose to produce vasoconstriction or to the conjunctiva to produce mydriasis, solutions of the salts may be employed.

The nature and proportions of other ingredients that may be used, as excipients, with the salts comprising the medicinal agent, are subject to wide variation, according to the therapeutic effect to be attained and the method in which the preparation is to be administered. Thus the proportion of the salts to the excipients may be as low as 1% or even less when used in solution, or as much as 50% or even as high as 90% in other cases, for example, as when used in solid tabletted form. While the salts may be used undiluted, an excipient of some sort is usually preferable to impart other desired physical properties, such as, for example, bulk, perfume, color or the like. Thus a medicinal agent in accordance with this invention may comprise the salts, alone or together with a suitable excipient.

By way of illustration, for example, tablets for oral administration are prepared by mixing one part of a stable, soluble, non-toxic acid addition salt of 1-(parahydroxyphenyl)-2-aminopropane with nine parts of lactose, or similar excipient and compressing into tablets weighing 200 or 500 milligrams each. Flavoring or coating of such tablets may be provided if desired.

Aqueous solutions for topical application to eye or nasal membranes are prepared by dissolving 1.0 g. 1-(parahydroxyphenyl)-2-aminopropane hydrobromide in 100 cc. of water saturated with boric acid, this water solution serving as an effective extender for the therapeutically active salt.

Elixirs for oral administration of the salts of the base are well prepared by dissolving 5 g. of the desired salt in 100 cc. of water and adding 125 cc. ethanol, 10 cc. of lemon flavor concentrate and 765 cc. of 60% simple sucrose syrup, which may be tinted with a certified dyestuff.

The advantages of oral administration of medicinal agents employed in the treatment of a chronic difficulty are obvious. Previous administration of agents of the character at present involved has been substantially confined to hypodermic injection subcutaneously, intramuscularly, or intravenously, which provides more direct introduction into the blood stream. Such administration is clearly unsuited to self-treatment, in view of the difficulties interposed with respect to obtaining sterile conditions. Furthermore, the continuous use of hypodermic injections is well-known to have a deleterious local effect upon body tissues. On the other hand, the medicinal agents of the character herein described may be self-administered without difficulty and without danger of infection, and without the deleterious effects attendant upon continued use of hypodermic injections.

This application is a division of the application filed by me September 16, 1938, Serial No. 230,205, which application was filed by me as a continuation-in-part of the application filed by me July 13, 1935, Serial No. 31,279.

What I claim and desire to protect by Letters Patent is:

1. A medicinal agent for administration by application to mucosal membranes to stimulate peripheral neuro-muscular mechanisms under control of the sympathetic nervous system, comprising 1-(parahydroxyphenyl)-2-aminopropane hydrogen acid tartrate suitably extended by association with an excipient adapting it for application to mucosal membranes.

2. A medicinal remedy for administration by introduction into the gastro-intestinal tract to stimulate peripheral neuro-muscular mechanisms under the control of the sympathetic nervous system comprising 1-(parahydroxyphenyl)-2-aminopropane hydrogen acid tartrate in a form for oral administration.

3. A medicinal agent for administration by application to the conjunctival mucosa to stimulate peripheral neuro-muscular mechanisms under control of the sympathetic nervous system, comprising 1-(parahydroxyphenyl)-2-aminopropane hydrogen acid tartrate suitably extended by association with an excipient adapting it for application to the conjunctival mucosa.

4. A medicinal agent for administration by application to the nasal mucosa to stimulate peripheral neuro-muscular mechanisms under control of the sympathetic nervous system comprising 1-(parahydroxyphenyl)-2-aminopropane hydrogen acid tartrate suitably extended by association with an excipient adapting it for application to the nasal mucosa.

GORDON A. ALLES.